United States Patent

Vawter

[11] Patent Number: 5,623,727
[45] Date of Patent: Apr. 22, 1997

[54] METHOD FOR MANUFACTURING POWDER METALLURGICAL TOOLING

[76] Inventor: Paul Vawter, 668 W. Magill, Fresno, Calif. 93074

[21] Appl. No.: 558,731

[22] Filed: Nov. 16, 1995

[51] Int. Cl.⁶ ............................................. B22F 3/14
[52] U.S. Cl. ............................ 419/51; 419/52; 419/57
[58] Field of Search ............................ 419/51, 52, 57

[56] References Cited

U.S. PATENT DOCUMENTS

| 3,665,151 | 5/1972 | Piper | 219/149 |
|---|---|---|---|
| 3,689,259 | 9/1972 | Hailey | 175/226 |
| 3,700,435 | 10/1972 | Chandhok | 75/214 |
| 4,041,123 | 8/1977 | Lange et al. | 264/332 |
| 4,171,339 | 10/1979 | Lee et al. | 264/332 |
| 4,389,362 | 6/1983 | Larsson | 264/111 |
| 4,456,578 | 6/1984 | Ward | 419/8 |
| 4,478,789 | 10/1984 | Adlerborn et al. | 419/49 |
| 4,501,718 | 2/1985 | Bradt | 419/49 |
| 4,518,441 | 5/1985 | Hailey | 148/11.5 |
| 4,531,705 | 7/1985 | Nakagawa et al. | 249/134 |
| 4,539,175 | 9/1985 | Lichti et al. | 419/49 |
| 4,547,337 | 10/1985 | Rozmus | 419/49 |
| 4,594,219 | 6/1986 | Hostatter et al. | 419/8 |
| 4,627,958 | 12/1986 | Hays | 419/8 |
| 4,747,999 | 5/1988 | Hasselstrom | 419/49 |
| 4,756,752 | 7/1988 | Barnard | 25/230 |
| 4,778,650 | 10/1988 | Hermansson et al. | 419/38 |
| 4,861,546 | 8/1989 | Friedman | 419/8 |
| 5,032,352 | 7/1991 | Meeks et al. | 419/8 |
| 5,041,261 | 8/1991 | Buljan et al. | 419/11 |
| 5,093,076 | 3/1992 | Young et al. | 419/12 |
| 5,134,260 | 7/1992 | Piehler et al. | 219/10.41 |
| 5,178,691 | 1/1993 | Yamashita et al. | 148/101 |
| 5,227,235 | 7/1993 | Moro et al. | 428/357 |
| 5,246,638 | 9/1993 | Goldberger | 264/27 |
| 5,344,800 | 9/1994 | Jackson et al. | 501/90 |
| 5,346,667 | 9/1994 | Kamitsuma et al. | 419/52 |
| 5,348,800 | 9/1994 | Moro et al. | 428/328 |
| 5,380,482 | 1/1995 | Maginnis et al. | 419/33 |
| 5,405,570 | 4/1995 | Fuma et al. | 419/2 |

FOREIGN PATENT DOCUMENTS 2050926  1/1981  United Kingdom.
2140825  12/1984  United Kingdom.

Primary Examiner—Charles T. Jordan
Assistant Examiner—Daniel Jenkins

[57] ABSTRACT

A method for powder metallurgical manufacturing of an article wherein a refractory die is used to form an article without excessive shrinkage. The method includes the addition of coarse and fine particulate material and consolidating the material.

5 Claims, 1 Drawing Sheet

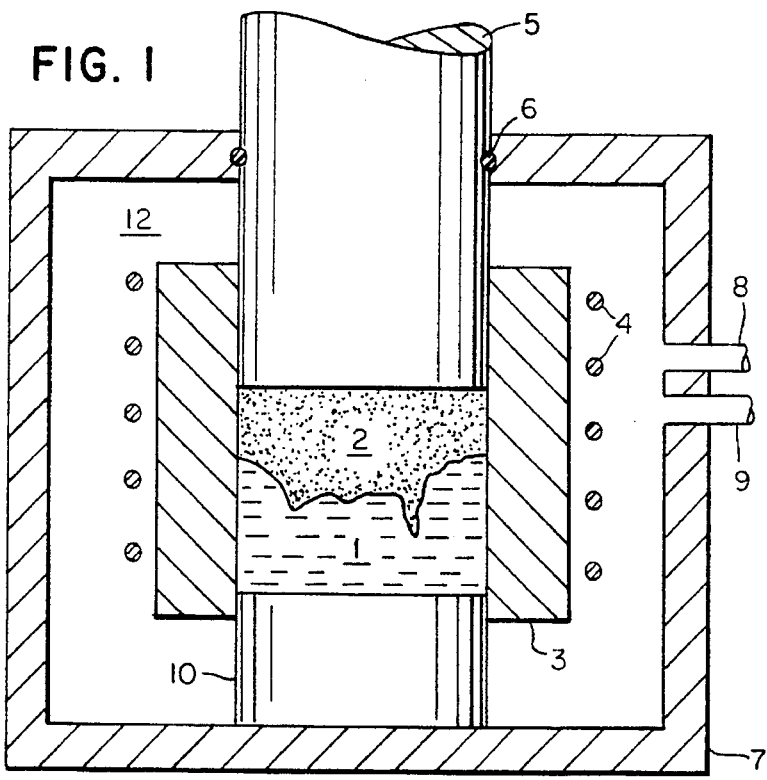
FIG. 1
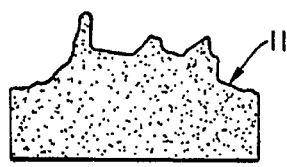
FIG. 2
FIG. 3
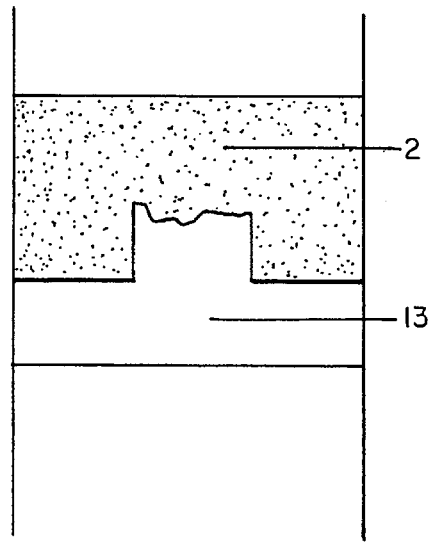
FIG. 4
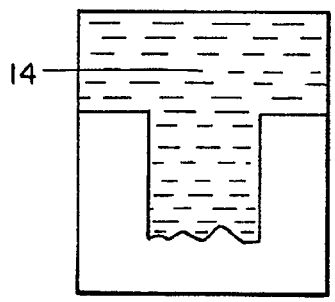

METHOD FOR MANUFACTURING POWDER METALLURGICAL TOOLING

FIELD OF THE INVENTION

This invention relates to a method of powder metallurgical manufacturing of an article in which a refractory die gives a consolidated particulate material a shape.

BACKGROUND OF THE INVENTION

Processes of producing consolidated powdered metallurgical articles are well known. For example, U.S. Pat. No. 4,747,999 to Hasselström describes a powder metallurgical method of producing a consolidated powder metallurgical article using a particulate pressure medium which is preheated in a special container, in a "fluidized" bed to the forging temperature, then transferred to an outer mold and pressure is applied to the pressure medium by means of a pressure tool. Unfortunately, this method requires a pressure medium and one has to have a fluidized bed and equipment to preheat this pressure medium then transfer its contents to an outer mold.

This method of manufacture does not provide a means to control shrinkage or physical dimensions in the ceramic mold and/or consolidated article, but requires a shrinkage compensated model. This process would not allow existing parts, dies, molds and patterns with finished dimensions to be candidates for the original model. This requirement of producing an oversized model increases steps and labor costs.

Inter-particle friction of this pressure medium has additional drawbacks. This inter-particle friction is described in UK patent 2140825A, in which a method is described to reduce this friction and inconsistent pressure. Inter-particle friction requires this process to use increased pressure or heat to consolidate the powder metal article requiring larger equipment and energy costs. This prior art process has the additional limitations of requiring the crushing of a ceramic mold to remove finished articles. This removal method would not allow the ceramic mold material to be removed from internal passageways or cavities. This severely limits part configuration possibilities.

Other prior art uses heat and pressure to further increase the density of a pre-consolidated powder metal article requiting metal dies machined to desired part geometry. This die is loaded with metal powder and compressed in the range of 20,00–100,000 p.s.i. at room temperature. The article is then ejected from the die and transferred to a furnace and sintered to increase density or particle bonding. The article is then transferred to a forging die and is surrounded by a particulate pressure medium, heat and applied pressure transfers through this medium to further consolidate the metal article to high density.

The disadvantages of this prior art requires numerous steps and equipment to produce a powder metal article of complex shape, high density and dimensional accuracy. Cold compaction pressures of 20,000–100,000 p.s.i., followed by sintering requires expensive powder compacting equipment, metal tooling and a sintering furnace to produce a pre-consolidated metal part. The additional steps of placing a pressure medium in a forging die, positioning the metal article upon this medium, covering the metal article with additional medium and heating the pressure medium and metal article to forging temperature to consolidate the metal article to high density increases labor, material and energy costs.

An additional drawback of requiring a pressure medium is interparticle friction. Compressing the medium causes non-uniform pressure on the metal article being consolidated, which results in distortion and loss of dimensional accuracy. U.S. Pat. Nos. 4,539,175 and 4,501,718 give reference to reducing distortion. The loss of dimensional accuracy requires secondary machining of the article to final its dimensions which increases costs. This pressure medium has the additional disadvantages of increasing surface area and volume, requiring larger forging dies, and requiring additional pressure and/or heat. The results being larger equipment is required to consolidate a metal article and an increase in equipment, energy and labor costs.

U.S. Pat. No. 4,041,123 discloses a method of producing a powder article which requires producing a pre-consolidated article by mixing a ceramic powder and water to form a slurry which is casted into a porous mold. This pre-formed body has a void content of 30–60%. A pressure medium, heat and applied pressure are used to further consolidate the article to higher density. This method has several disadvantages. Slip casting requires a porous mold to be fabricated from an original article or rubber mold and requires water contents of 40–70% which leaves a particulate density of only 30–60% by weight, and tremendous shrinkage results both when drying and in final consolidation. In addition, the density of a slip cast part varies. This is caused by larger, heavier powder particles settling at the bottom of the mold causing density gradients and resulting in non-uniform shrinkage which is well known in the art. This distortion is further increased by the use of a particulate pressure medium. Interparticle friction of a pressure medium causes non-uniform pressure on the ceramic article being consolidated resulting in distortion or loss of dimensional accuracy as noted in U.S. Pat. Nos. 4,501,718 and 4,539,175. This distortion or loss of dimensional accuracy increases the need for machining the article to its final dimensions and increases costs. The pressure medium increases the surface area or volume and this requires the higher pressures and/or heat for consolidation. Larger dies are necessary to accommodate the pressure medium resulting in increased machine size, labor and energy costs.

Other prior art techniques are shown in U.S. Pat. No. 4,041,123, which teaches a casted ceramic article that is made more dense by a pressure medium that requires heat and applied pressure to further increase density to the casted ceramic article. This technique can not produce a complex metal article in situ, but uses the heat and pressure operation to only further make dense a pre-consolidated article.

The prior art method shown in U.S. Pat. No. 4,547,337 discloses a method to consolidate a powder in which the powder to be consolidated is vacuumed in a hermetically sealed cylindrical container and is embedded in a glass material that becomes viscous at the desired temperature. Applied pressure deforms this glass pressure medium in turn applying pressure on the inner cylindrical container containing a powder which is then consolidated. It is mentioned that if a more intricately shaped article is required, the cylindrical inner container may be eliminated, and other materials of elastomers could be used to produce an intricately shaped rubber mold to encapsulate the powder metal which could transfer its shape to this powder metal under pressure producing an intricately shaped article. This method of manufacture requires a pressure medium that collapses, deforms or becomes viscous under heat and/or pressure to consolidate a powder metal. The nature of a pressure medium which becomes viscous or deforms under heat and/or pressure would transfer this deformation to the loose powder metal during consolidation, causing distortion and loss of dimensional accuracy, thus requiring machining the article to final its dimensions which increases costs. Additional steps of manufacturing, a cylindrical container and then requiring a glass material to be casted around this container also increases costs.

The use of the pressure medium step has the additional disadvantage of a requiring larger forging die to contain this medium, and, in turn, increases surface area or volume which requires higher heat and/or pressure to consolidate the metal powder. It also increases machine size, energy and labor costs. This prior art mentions the use of the elastomer tooling to apply pressure to the powder metal. The method has the disadvantage of deforming the loose metal powder at room temperature and would require additional steps to place the article in a pressure medium using heat and applied pressure for further consolidation to produce a high density article. The article would experience further deformation by this additional consolidation step requiring secondary machining to final its dimension which would increase costs.

A further process is shown in U.S. Pat. No. 4,389,362 which discloses a process for making a metal billet by encapsulating metal powder in a metal capsule, or as it more commonly known "metal can," and placing a pressure transmitting medium that becomes viscous at consolidation temperature between the can one and can two, which must be fabricated to encapsulate this pressure medium. A second pressure medium is required to compress can two. Heat and an applied pressure medium which makes more dense can two in turn makes more dense. The viscous pressure medium in turn makes more dense can one, which contains the powder metal. This is a method that requires numerous troublesome steps to consolidate a metal powder. First, fabricating a metal can which is usually done by sheet metal equipment to form a can required to contain a powder metal. This "can" requires embedding in an outer pressure medium requiring another can to be manufactured requiring another different pressure medium. This method requires two "cans" and two different pressure mediums and different pressure medium materials, medium one glass, medium two talc. This method cannot produce a complex shaped article in situ but requires multiple manufacturing steps of producing metal cans to contain either pressure medium or metal powder. The pressure medium that deforms or becomes viscous transfers that shape or deformity to the loose metal powder being consolidated. The additional outer pressure medium has interparticle friction which causes uneven pressure and causes additional distortion which is disclosed in U.S. Pat. Nos. 4,501,718 and 4,539,175. The distortion causes loss of dimensional accuracy and requires machining the article to its final dimensions which increases the steps and costs. These two pressure mediums increase volume and surface area which require larger dies, higher heat and/or pressure resulting in larger machinery required and higher energy and labor costs.

SUMMARY OF INVENTION

The object of the invention is to offer an improved metallurgical method, in which the above mentioned drawbacks or limitations of the prior art methods are eliminated.

The method of the present invention utilizes a refractory die in which surfaces of the refractory die define the pattern of the article to be fabricated. The refractory die is positioned in a forging die of a furnace where it is supported on a lower ram. The forging die is filled with fine particulate materials, which cover the refractory die. The forging die with its contents of the refractory die and particulate materials is heated in an inert or reducing atmosphere at a threshold temperature. High pressure is subjected to the forging die with its contents of the refractory die and particulate materials under the influence of at least one pressure means, a movable upper ram. The movable upper ram is pressed in an axial downward direction, wherein the pressure is transferred to the particulate materials. As a result, the fine particulate material is consolidated to a dense body with surfaces which have been shaped by the refractory die. The temperature is lowered in the forging die so as to remove the consolidated article and refractory die. The refractory die is removed by mechanical thermal shock or chemical leaching from the consolidated article.

The refractory die is produced by replicating an original model, which may be manufactured by rapid proto-typing, machining, casting or other methods. A rubber form or various materials can be used to produce a reversal and additional patterns on the refractory die.

The fine particulate materials of the finished article normally comprises metal powder. Metal powder may include powders of unalloyed metals as well as powders of metal alloys. The metal powder also completely or partly may comprise non-metallic material, such as plastic, ceramic, carbides and other hard agents. In addition, mixtures of several metal and/or alloy powders and/or admixtures of non-metallic powered material may be used. Furthermore, fine particulate materials completely or partly may comprise fibers, such as metal fibers, ceramic fibers or carbon fibers.

The refractory die is made of coarse and fine silicon carbide particles. Various materials are added to control density, expansion and porosity during the process.

BRIEF DESCRIPTION OF THE DRAWINGS

FIG. 1 schematically illustrates the manufacturing process and equipment.

FIG. 2 shows a consolidated article which has been produced according to the invention.

FIG. 3 is a cross-sectional view of the particulate materials cooling and solidifying around a core of a refractory die.

FIG. 4 is a cross-sectional view of a refractory die mixture casted into layers.

DETAILED DESCRIPTION OF THE PREFERRED EMBODIMENT

In FIG. 1, a refractory die (1) is designated with the numeral (1). It is manufactured by means of replicating an original model using refractory coarse and fine materials, liquids and binders to produce an article by casting or other methods. The refractory die (1) is positioned in a forging die (3) and is covered with the particulate materials (2). A movable upper ram (5) provides at least one source of axial pressure upward and downward in the forging die (3). The movable upper ram (5) passes through a sealed inlet (6) of a furnace (7). The interior of the furnace (12) can be heated by means of interior heating elements (4). The interior of the furnace (12) can also be subjected to a gas flow through connections (8,9). The connections (8,9) are utilized for evacuating the air of the interior furnace (12) with a protective gas such as nitrogen and/or hydrogen, before the particulate materials is consolidated. During consolidation, the movable upper ram (5) is pressed downward to provide axial pressure on the particulate materials to a desired density which replicates the surface of the refractory die (1). When the desired article (11) has been consolidated, the temperature of the furnace (7) is lowered and the refractory die (1) and the consolidated article (2) is removed. The refractory die (1) is removed by mechanical methods or chemical leaching to recover the consolidated article (11) as shown in FIG. 2.

The refractory die is formulated to give multiple physical and chemical properties and improvements in regard to particle packing density, dimensional expansion and control, infiltration, to improve strength and chemical compatibility between refractory die materials, powder metal and chemical leachants.

The refractory die is made of coarse and fine particles. Sizes are carefully graduated from 6 mesh through –325 mesh in specific proportions to obtain a particle packing density of over 90 percent. Liquids, rheology agents, binders and vibration are utilized to produce a castable mix that replicates the original article. This method of producing a refractory die is superior to other casting or forming methods in regard to particle packing density, strength, dimensional accuracy and economy.

Refractory die material are further selected as to be chemically compatible with powder metals at consolidation temperatures. With additional regard to compatibility of refractory die materials, powder metal and chemical leachants.

Materials and infiltrants contained in the refractory die may be whole or in part, but not limited to titanium diboride, tungsten carbide, chromium carbide, silicon carbide, graphite, silica, silicon, silicon nitride, nitrogen, zirconia, alumina, kyanite, aluminum nitride, yitteria and zinc oxide.

The forging die (3) may be made of graphite or other suitable material to withstand the heat and/or pressure necessary to consolidate the particulate materials.

During the consolidation step, the particulate materials (2) solidifies resulting to the particulate materials (2) shrinking tight around the refractory core (13) as shown in FIG. 3. To reduce shrinkage, one example may be water cooling the lower ram to a temperature below the upper ram allowing the particulate materials (2) around the refractory die to cool first, while the large mass of powder above remains hot and supplies feed material. This method reduces shrinkage in critical dimensional tolerant areas around the refractory die. The refractory die may further contain thermally conductive materials such as silicon carbide or aluminum nitride to facilitate the heat transfer to the water-cooled lower ram.

The upper and lower rams can be made to move independently of one another, allowing added control when consolidating the particulate material to improve part density and dimensional tolerance in the finished product.

A second example of avoiding shrinkage may be in manufacturing and replicating the refractory die. The composition mixture of the refractory die may further include Kyanite. Kyanite is a material that has a unique ability to expand permanently when heated. The refractory die composition with Kyanite is heated to the desired expansion dimension giving an advantage of not only compensating for shrinkage in the particulate material consolidation, but also for materials used in molds and dies.

Kyanite can be added to this mix for permanent physical expansion upon heating to further control physical dimensions. It has been found that evaporation of liquid binders and sintering at elevated temperatures to produce physical expansion can leave porosity in the refractory die. This porosity or void content can allow the refractory die to further density or deform when applying sufficient heat and pressure when consolidating metal powders to high density. This shrinkage can result in a powder metal article with poor dimensional accuracy and surface finish. Improvements are made to this detriment by producing a refractory die by the above method and using an additional step of melt infiltrating the refractory die with materials melted in contact with the refractory die at such temperature capillary action will infiltrate the refractory die to fill residual porosity. This additional step of infiltration has the added advantage to further densify the refractory die and not experience the degree of shrinkage and/or deformation that normally occurs when sintering or firing a refractoy die to high density. These improvements translate to improve dimensional accuracy and surface finish of the finished article.

A third example may be attaching to the upper ram or movable ram the refractory die. At consolidation temperature, the refractory die may be plunged into the particulate materials and extracted before the particulate materials cools, eliminating the steps of removing the refractory die by mechanical or chemical leaching.

FIG. 4 shows a refractory die mixture (14) being manufactured by casting in ⅛ inch thick layers, wherein water is added to make the refractory die mixture flowable in order to cast layers. The excess water that is not needed in the mixture is removed by wicking with a swab, so as to reduce the liquid contents. The removal of the excess water reduces the liquid content in the mixture reducing shrinkage and porosity in the refractory die, thus increasing the strength and dimensional tolerance of the refractory die.

I claim:

1. A method for powder metallurgical manufacturing of an article, wherein a refractory die defines a consolidated particulate material a shape, said method comprising the steps of:

providing a refractory die which is replicated from an original model by casting or other methods;

positioning said refractory die in a forging die supported on a lower ram; filling said forging die with the particulate materials and covering said refractory die with fine particulate materials;

heating said forging die with its contents of said particulate materials and said refractory die in an inert or reducing atmosphere at a consolidation temperature;

subjecting the said particulate material and said refractory die to pressure by at least one pressure means, a movable ram which passes through a sealed inlet of said furnace, said movable ram is pressed downward to transfer axial pressure to said particulate materials in order to consolidate said particulate materials and form a dense body replicating the surface of said refractory die;

lowering the temperature of the forging die so as to remove a consolidated article and refractory die; and removing the said refractory die from the said consolidated article by mechanical, thermal shock or chemical leaching.

2. Method of claim 1, wherein said refractory die is replicated from an original model by casting in ⅛ inch thick layers by adding liquid to a refractory mixture and removing excess liquid by wicking with a swab.

3. Method of claim 1, wherein during said consolidation temperature, said refractory die is attached to said movable ram and is plunged into the particulate materials and is extracted before the particulate materials cools.

4. Method of claim 1, wherein said refractory die is replicated from an original model by further adding to a refractory mixture Kyanite.

5. Method of claim 1, wherein said lower ram is water cooled to a temperature below said movable ram allowing said particulate material around refractory die to cool first, while the large mass of particulate materials above remains hot and supplying feed materials.

* * * * *